United States Patent Office 2,888,072
Patented May 26, 1959

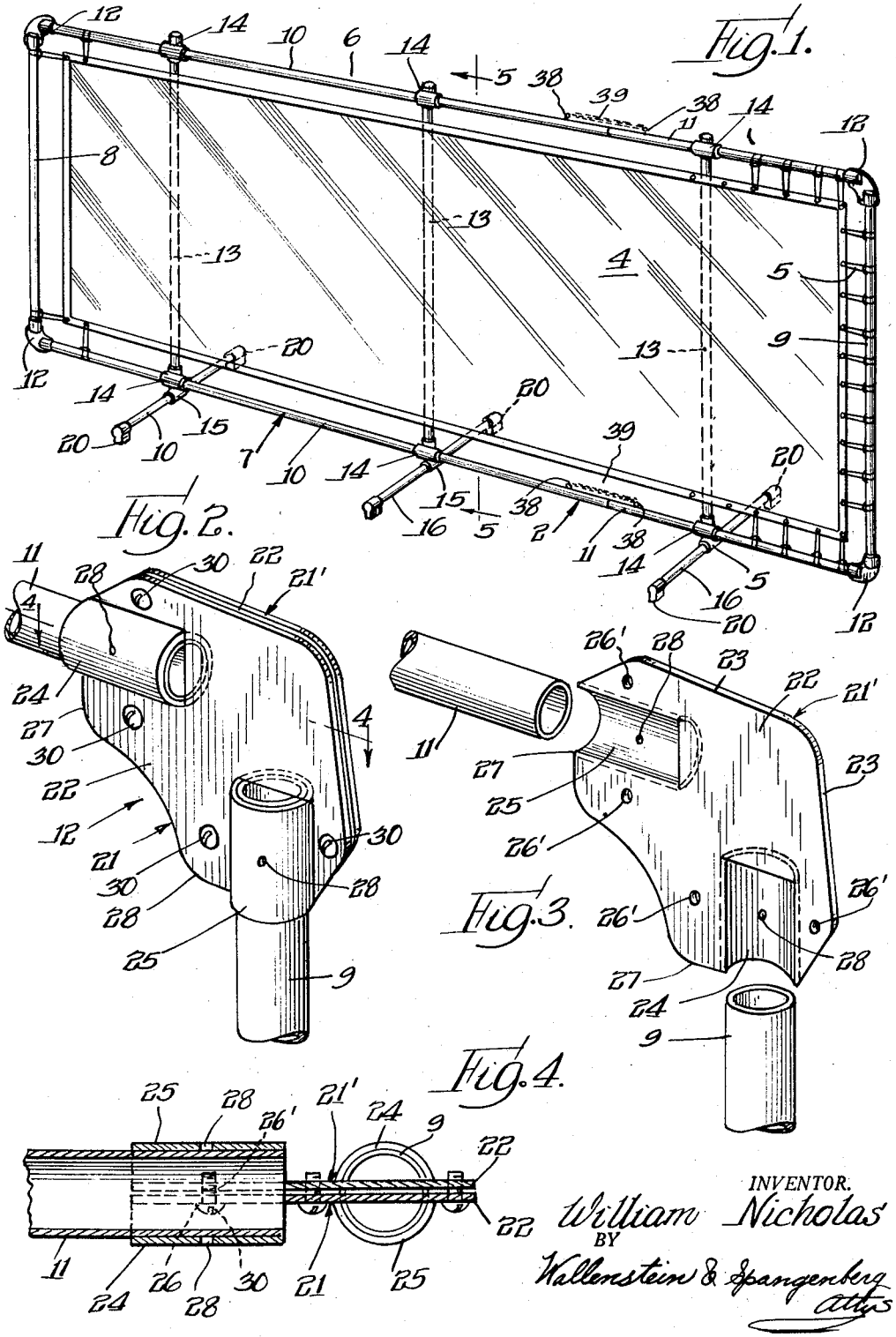

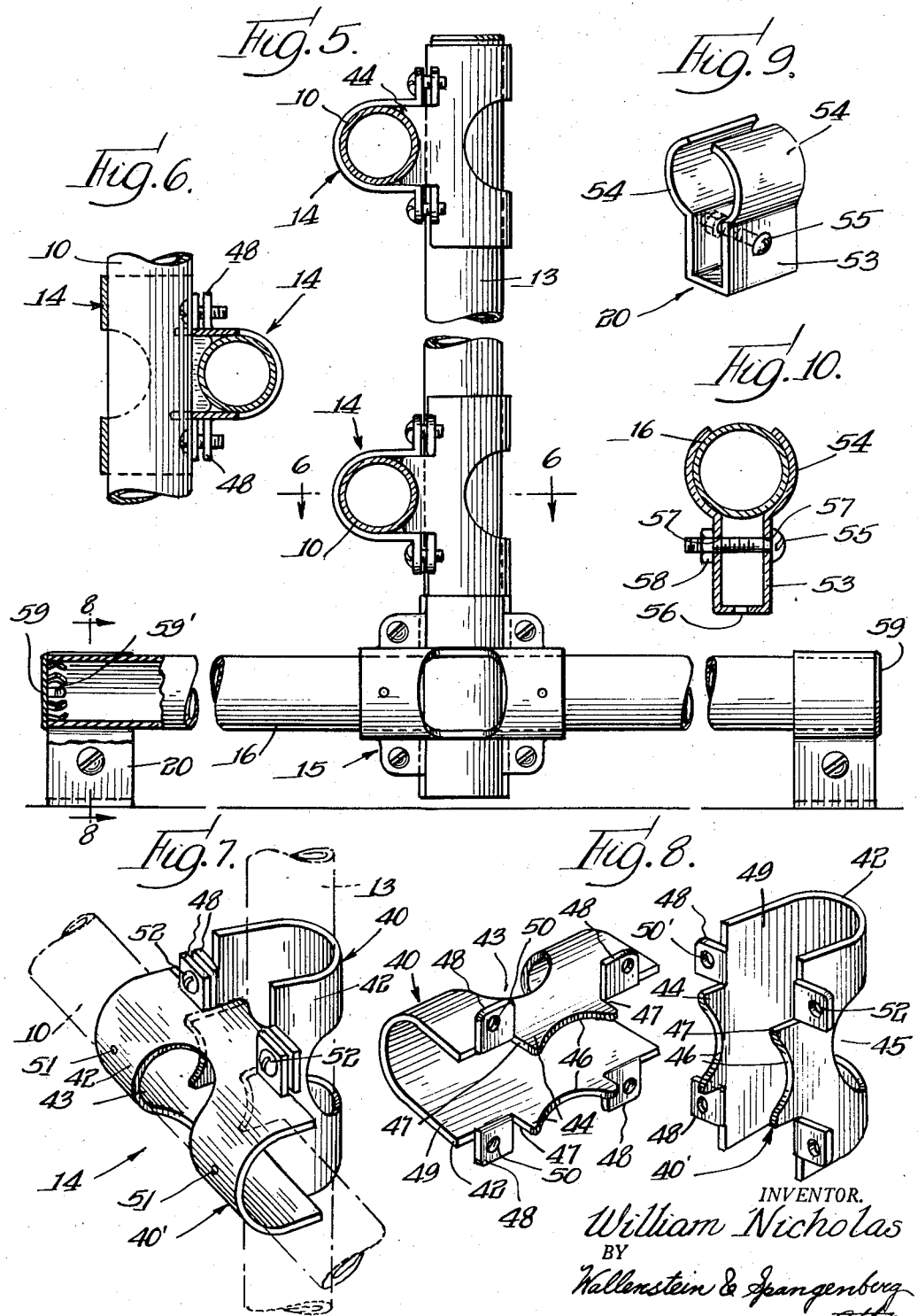

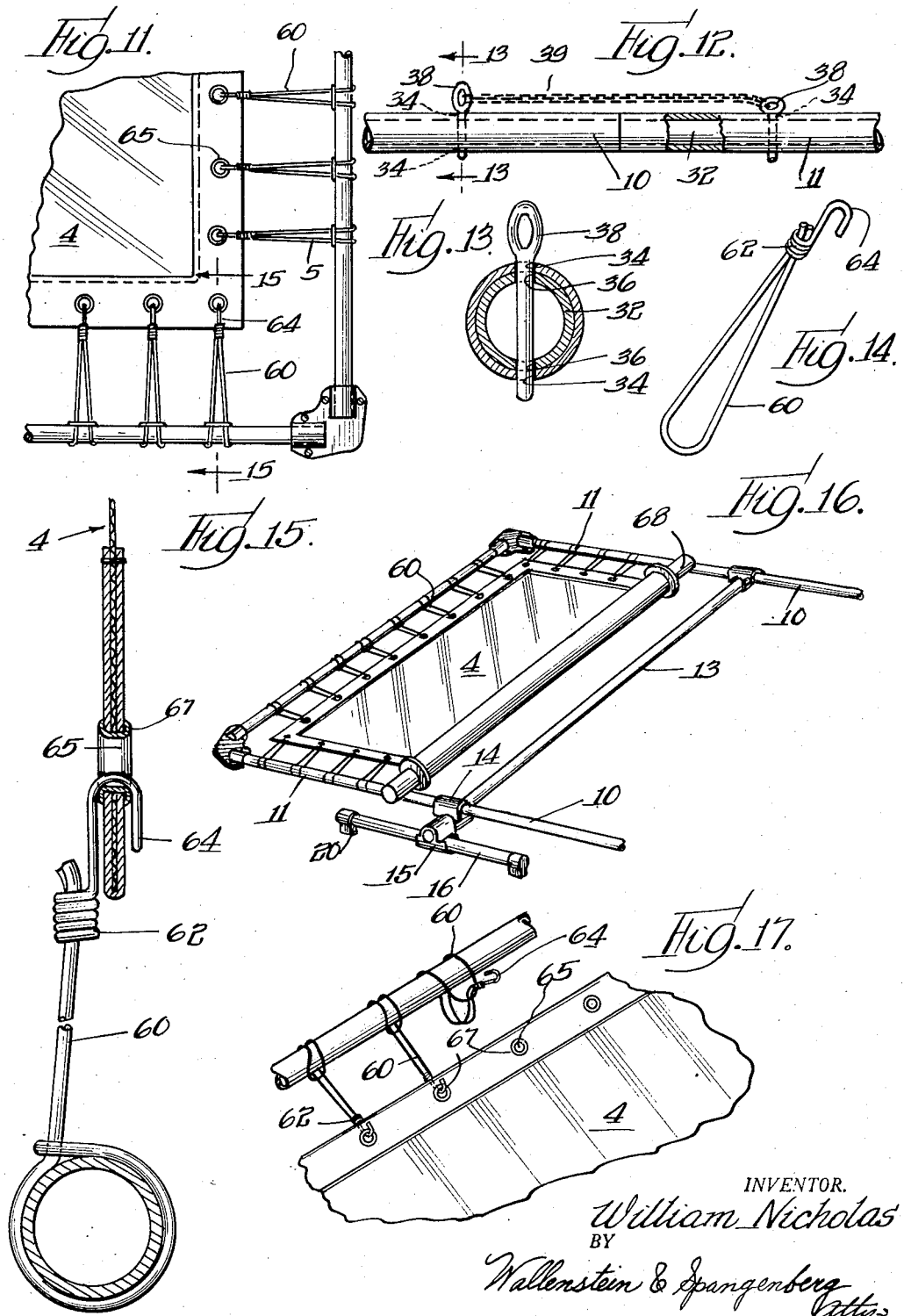

2,888,072

PORTABLE CINEMASCOPE SCREEN ASSEMBLY

William Nicholas, Evanston, Ill., assignor to Radiant Manufacturing Corporation, Chicago, Ill., a corporation of Illinois Application June 20, 1956, Serial No. 592,544

9 Claims. (Cl. 160—377)

This invention relates to a knock-down support frame, particularly to a knock-down support frame used to support a projection screen.

With the advent of large, wide-angle projection screens, for example screens for cinemascope projection, there has been a need for portable, knock-down screen equipment for use at conventions, and for other temporary uses where wide-angle screen installations are not otherwise available.

Among the primary objects of this invention are: to provide a support frame, particularly one for use with a large projection screen, which may be assembled and disassembled quickly and easily by means of simple and inexpensive couplings or fittings which hold together various structural support elements forming the support frame for the screen; to provide a knock-down frame assembly having a peripheral frame portion made of separate, preferably tubular co-planar support members which are joined together at the four corners of the frame by couplings made of sturdy, inexpensive sheet metal material; to provide a knock-down frame assembly having leg support members and/or cross members which are offset with respect to and are joined to the frame by couplings made of sturdy, inexpensive sheet metal material; to provide a frame assembly of the type above described which includes sturdy leg support members for supporting the frame upright and which support members carry novel foot pieces made of inexpensive sheet metal material; and to provide a large screen assembly having a floor-supported, knock-down frame upon which the screen is mounted, wherein the assembly may be readily assembled and disassembled by one or a few men without requiring the use of ladders or other elevating means by the assemblers thereof.

In accordance with a preferred form of the invention, the corner fittings each comprise a pair of sheet metal coupling members each having a pair of open-end channels extending at right angles to one another and sized to be laterally applied over co-planar sections of the frame. Each coupling member is preferably identical to the other coupling member, except perhaps for the fact that holes in one of the members are unthreaded and holes in the other member are threaded. The coupling members are arranged with their channels confronting one another to form sockets for receiving the ends of the frame sections. The members are drawn together by screws passing through the unthreaded holes and threading into the threaded holes above mentioned to draw the coupling members tightly around the ends of the co-planar sections of the frame to be joined together.

To increase the rigidity of the peripheral frame, vertical intermediate frame sections are secured to the upper and lower horizontal frame sections by couplings or fittings formed from sheet metal stampings. Each coupling preferably comripses a pair of complementary sheet metal coupling members which are identical except for the fact that one of the members contains unthreaded holes and the other contains threaded holes. Each coupling member comprises a U-shaped body portion forming a channel which receives either a horizontal or a vertical intermediate frame section. Projecting from the ends of the channel sides of each coupling member are a pair of tongues having recesses formed therein which are in alignment at right angles to the associated channel. These tongues are adapted to extend between the channel sides of the other complementary coupling member when the members are oriented at right angles to one another. The recessed tongues are adapted to fit around the frame section in the channel in which the tongues extend. Transverse tabs are formed at the ends of the channel sides of each coupling member and the tabs of the members are juxtaposed with respect to one another. Screws passing through holes of the tabs of one of the coupling members and threading into holes in the tabs of the other coupling member draw the two together to clamp the same tightly around the frame sections.

In the form of the invention which includes a projection screen, the projection screen is secured to the peripheral portions of the frame by resilient thongs which are looped around the frame sections and are secured to the perimeter of the screen by hook members. The screen is removed from the frame by the simple expedient of removing the hooks from the screen whereupon the screen may be rolled into a compact unit.

To support the screen and peripheral frame in an upright position, horizontally extending leg-support sections are utilized which extend transversely below the lower horizontal section of the peripheral frame. These leg-support sections are secured to the projecting bottoms of the aforementioned intermediate vertical frame sections by the same type of couplings described above for connecting the intermediate vertical frame sections to the horizontal frame sections. Carried on the ends of the latter horizontal leg-support sections are leg pieces which are sheet metal stampings each formed from a narrow metal strip bent back and shaped to form a member having upstanding channeled ends which form a socket which receives one of the horizontal leg-support sections. The bottom intermediate portion of each leg piece rests upon the floor. The opposed channeled ends thereof are clamped to the leg-support section by a bolt extending between the opposed ends of the leg piece below the channeled portion thereof and a nut threaded on the end of the bolt.

The resultant screen assembly is sturdy and easy to assemble and disassemble, particularly due to the design of the couplings which are easy to apply and relatively inexpensive to fabricate.

Other objects, advantages and features of the invention will be apparent upon making reference to the specification to follow, the claims and drawings wherein:

Fig. 1 is a perspective view of a cinemascope screen assembly constructed in accordance with the present invention;

Fig. 2 is an enlarged perspective view showing the construction of the corner joints or couplings of the screen assembly;

Fig. 3 shows one of the joint halves in Fig. 2 and a pair of tubular frame sections to be joined thereby;

Fig. 4 is a horizontal section through the joint shown in Fig. 2, taken along section line 4—4 therein;

Fig. 5 is an enlarged vertical transverse sectional view through the frame assembly, taken along section line 5—5 in Fig. 1;

Fig. 6 is a horizontal transverse section through one of the joints shown in Fig. 5, taken along section line 6—6 therein;

Fig. 7 is a perspective view of the joints shown in Fig. 5, with the tubular frame section shown in dotted lines;

Fig. 8 is a perspective view of the main parts making up the joint in Fig. 7;

Fig. 9 is a perspective view of one of the leg pieces utilized to support the screen assembly of the invention;

Fig. 10 is a vertical transverse section through the leg piece of Fig. 9;

Fig. 11 is an elevational view of the lower right hand corner of the screen assembly shown in Fig. 1, and illustrates the manner in which the screen is secured to the screen support frame;

Fig. 12 is a fragmentary elevational view showing the manner in which adjacent horizontal tubular frame sections are joined together in the frame assembly of the invention;

Fig. 13 is an enlarged transverse section through the portion of the frame shown in Fig. 12, taken along section line 13—13;

Fig. 14 is an enlarged view of one of the thongs and attached hook used to secure the screen to the screen support frame;

Fig. 15 is an enlarged fragmentary sectional view through the screen and support frame therefor, taken along section line 15—15 in Fig. 11;

Fig. 16 is a perspective view of the screen and frame assembly showing the position of the screen support frame as the screen is being applied to or removed from the frame; and Fig. 17 is a fragmentary enlarged perspective view of the screen and frame showing the manner in which the screen is secured to the frame.

Referring now more particularly to Fig. 1 which shows the complete screen assembly in assembled condition. The screen assembly comprises a support frame structure generally indicated by the reference numeral 2 and a wide cinemascope type screen 4 removably secured to the frame structure by connecting means 5 to be described. The frame structure includes a rectangular peripheral frame portion enveloping the screen 4. This frame portion includes upper and lower horizontal frame sections 6 and 7 and left and right hand vertical frame sections 8 and 9. The upper and lower horizontal frame sections each comprise a long, preferably metal tube 10 of aluminum or similar material and a short tube 11 of the same size and material, the tubes being joined together by means to be described more fully hereafter. The vertical left and right hand frame sections 8 and 9 each preferably comprise a single tube of the same size and material as the tubes 10 and 11. The ends of the aforementioned horizontal and vertical tubular frame sections are joined together by corner joints or couplings 12 which secure the various tubes in substantially the same vertical plane. To increase the strength and rigidity of the frame, intermediate vertical frame sections 13 are secured to the upper and lower horizontal frame sections by joints or couplings 14 which secure the same together in offset planes. The intermediate vertical frame sections 13 are preferably made from the same tubular stock as the other aforementioned tubular frame sections.

The intermediate vertical tubular frame sections 13 extend below the lower horizontal tubular frame section 7 where they are joined by couplings 15 to horizontally extending preferably tubular leg-support sections 16 extending transversely of the lower horizontal frame section 7. The couplings or joints 15, in the interests of standardization, are preferably of the same size and construction as the couplings 14 which secure the intermediate vertical frame sections 13 to the horizontal frame sections 6 and 7. Leg pieces 20 are secured around and depend from the ends of the transverse horizontal tubular sections 16 which are preferably made from the same tubular stock as the other tubular frame sections. The construction of the various joints which form a very important part of the present invention will now be described in detail.

The corner couplings 12 each include a pair of complementary coupling members 21—21' which are sheet metal stampings which are symmetrical with reference to a 45° angle line passing through the outer corner thereof. The two pieces may be identical stampings one of which is inverted and turned around with respect to the other to form complementary halves. This construction avoids the necessity for having right and left hand coupling pieces.

Each of the coupling members includes an angle-shaped flat plate-like body 22 having intersecting outer edges 23—23 at right angles to one another and end edges 27—27 extending at right angles to one another. A pair of almost semi-cylindrical portions 24 and 25 are struck from the plate-like body 22 to form channels in the same face of the stamping which extend part way into the stamping body from the edges 27—27. These channels extend at right angles to one another.

A threaded hole 26' is formed in the plate-like body 22 of coupling member 21' on each side of each channel thereof, and correspondingly located unthreaded holes 26 are formed in the other coupling member 21. The associated coupling members are arranged with their concave, channel-forming portions 24 and 25 in juxtaposed relationship so that a pair of substantially cylindrical sockets are formed at right angles to each other which sockets receive the ends of the associated horizontal and vertical tubular frame sections. The channels correspond in shape to the shape of the tubular frame sections they are to receive, but are made slightly less than semi-cylindrical so that they will not make contact with one another when placed around the tubular frame sections. The manufacturing tolerances are therefore less stringent and the coupling members may be clamped tightly around the frame sections by screws 30 passing through the unthreaded openings 26 and threading into the threaded holes 26'.

An unthreaded hole 28 is formed at the center of each channel-forming portion 24 and 25 so that if additional joint strength is required screws may be passed through each hole and threaded into a corresponding threaded hole formed in the end of the associated tubular frame sections.

As above stated, the upper and lower horizontal tubular frame sections 6 and 7 each comprise a long tube 10 and a short tube 11. Two tubes rather than one longer tube are used primarily because the longer tube would be unwieldy. These tubes are secured together by means shown more fully in Figs. 12 and 13. To this end, associated with each of the frame sections 6 and 7 is an extension tube 32 sized to fit slidably within the tubes 10 and 11. Each of the tubes 10 and 11 have a pair of vertically aligned holes 34, and the extension tube 32 has a pair of vertically aligned holes 36—36 at one end and a pair of vertically aligned holes 36—36 at the other end. The two pairs of holes of the extension tube 32 are spaced apart an amount equal to the spacing of the pairs of holes 34—34 in the tubes 10 and 11 when the latter are in abutment as shown in Fig. 12 so that the holes in the extension tube 32 can be aligned with the holes in tubes 10 and 11. Tubes 10 and 11 are anchored to the associated extension tubes 32 by respective pins 38—38 passing through these vertically aligned holes, the pins 38 being tied together by a suitable connecting chain 39 secured to the heads of the pins.

Refer now more particularly to Figs. 5-8 showing the construction of the couplings 14 and 15 which secure together the intermediate vertical tubular sections 13 with the upper and lower horizontal frame sections 6 and 7, and the bottom ends of the vertical tubular sections 13 with the leg-supporting tubular sections 16. Since each of the joints 14 are identical to each of the joints 15, only one of these joints will be described in detail. As in the case of the other couplings, couplings 14 and 15 are each made of a pair of coupling members formed by substantially identical sheet metal stampings 40—40' oriented at right angles to one another, the only difference being that holes formed in one of the coupling members are threaded and corresponding holes formed in the other stamping are unthreaded. The coupling members 40 and 40' have U-shaped body portions 42—42 forming open ended channels extending at right angles to each other. The body portions have cutaway portions 43—43. The sides of the channels have a pair of tongues 44—44 formed on the ends thereof in the same plane as the channel sides and the tongues have recesses 46—46 formed in the edges thereof, the curvature of the recesses corresponding to the curvature of the tubular frame sections with which they are to be associated. The side edges 47—47 of each pair of the tongues are parallel to and are mutually adapted to be slidably received between the parallel inner side surfaces 49—49 of the channel of the other coupling member of the pair, the recessed portions of each pair of tongues fitting part way around the tubular frame section in the channel of the coupling member into which they extend.

Extending transversely and outwardly from the outer edges on each side of the tongues of the channel sides are securing tabs 48. The tabs on one of the coupling members 40' have unthreaded holes 50', and the tabs on the other coupling member 40 have threaded holes 50. Screws 52 passing through the unthreaded holes 50' and thread into the threaded holes 50 to draw the coupling members together tightly around the frame sections to be joined. The coupling members are sized so that they do not make contact when tightly clamped about the frame sections. Manufacturing tolerances are therefore less stringent.

An unthreaded hole 51 is formed at each end of the U-shaped body portion 42 of the coupling member. These holes can receive screws which thread into holes which may be provided in the frame section.

Reference should now be made to Figs. 5, 9 and 10 showing the construction of the leg pieces 20 secured to the ends of the leg-supporting rod sections 16. These leg pieces are each sheet metal stampings comprising a narrow bent back strip of sheet metal having an intermediate channel-shaped portion 53 and curved ends 54—54 having confronting concave surfaces together forming a socket for receiving the tubular rod sections 16. This opening is normally larger than the size of the rod section 16, and the leg piece is securely clamped to the rod section by means of a bolt 55 passing through unthreaded aligned openings 57 in the channel-shaped portion 53 and a nut 58 applied tightly over the projecting end of the bolt. An unthreaded hole 56 extends through the bottom of each leg piece.

The open ends of the tubular leg-supporting rod sections 16 are closed by end caps 59 which are resiliently held therein by resilient fingers 59'.

Refer now more particularly to Figs. 11, 15, 16 and 17 illustrating the means by which the screen 4 is secured to the frame structure 2. This means includes a series of resilient thongs 60 formed from short lengths of rubber or similar material which are folded back to form a loop. The ends of the rubber pieces are secured together by looping or winding a wire 62 tightly therearound. A hook 64 is formed at the other end of the wire and the hooks are extended through openings 65 formed in the perimeter of the screen 4. These openings are lined by metal eyelets 67 which are clamped over the perimeter of openings formed in the screen perimeter.

To apply the screen 4 to the peripheral form portion of the frame structure 2, the leg-supporting tubular sections 16 are pivoted to a position where they extend parallel to the horizontal frame sections of the frame structure, as shown in Fig. 16. This permits the peripheral frame portion of the structure to be pivoted around the leg-supporting rod sections 16 into a substantially horizontal position as shown. Then, screen 4, which is wound about a spindle 68, is progressively unwound from the spindle and secured to the frame by looping the thongs around the tubular frame sections by passing the hook-attached ends of the thongs around each tube section and through the loops of the thongs as shown in Fig. 17 and securing the hooks in the eyelets 67. The thongs are so dimensioned that when the entire perimeter of the screen has been secured to the frame structure the thongs are under tension. Removal of the screen 4 from the frame structure is of course obtained by the reverse process from that just described.

It should thus be noted that the present invention provides a knock-down screen assembly which may be quickly and easily assembled as well as disassembled utilizing a maximum number of standard parts and inexpensive, easy to apply couplings or fittings joining together the various frame sections.

Although the form of the invention described above is the preferred form thereof, it should be understood that numerous modifications may be made therein without departing from the spirit of the broader aspect of the invention.

It is claimed as new and desired to be protected by Letters Patent of the United States.

1. In a knockdown support frame assembly formed of a number of separate frame sections, some of which are to be joined together in offset planes, coupling means for securely coupling offset frame sections together each comprising a pair of complementary coupling members orientated at the same angles as the offset frame sections to be secured together, said latter coupling members each having portions forming at least two channels which are sized to be applied laterally over a different one of said offset frame sections, and frame-section-engaging means shaped to fit partially around the frame section in the channel of the other associated coupling member to hold the same in the channel, and means for drawing the latter coupling members together to bring the same tightly around the offset frame sections.

2. A fitting for securing offset frame members together comprising: a pair of complemental, stamped, sheet metal coupling members oriented at right angles to one another and each having a U-shaped portion forming an open-ended channel which receives one of the frame members to be joined and which extends at right angles to the corresponding channel of the other coupling member which receives the other frame member to be joined, each of said coupling members having a pair of tongues extending from the ends of the channel sides in planes generally parallel to the channel sides and which have aligned recesses extending at right angles to the associated channel, said tongues fitting between the channel sides of the other coupling member, said tongues recesses fitting the frame member in the channel in which it extends, and means for drawing said coupling members together around the frame members to be joined.

3. In a knockdown support frame assembly formed of a number of separate frame sections which are to be joined together in offset planes, coupling means for securely coupling the offset frame sections together each comprising a pair of complementary coupling members oriented at the same angles said offset frame sections are to come together, said coupling members having respective portions forming respective channels which are sized to be applied laterally over a different one of said offset frame sections, and means on each coupling member shaped to fit partially around the frame section in the channel of the other coupling member to hold the same in the channel.

4. In a knockdown support frame assembly formed of a number of separate frame sections which are to be joined together in offset planes, coupling means for securely coupling the offset frame sections together each comprising a pair of complementary, identically sized and shaped, coupling members oriented at the same angles said offset frame sections are to come together, said latter coupling members having respective portions forming respective channels which are sized to be applied laterally over a different one of said offset frame sections, and means on each coupling member shaped to fit partially around the frame section in the channel of the other coupling member to hold the same in the channel.

5. In a knockdown support frame assembly formed of a number of separate frame sections which are to be joined together at right angles to one another in offset planes, coupling means for securely coupling the offset frame sections together each comprising a pair of complementary, stamped, sheet metal coupling members oriented at right angles to one another, said coupling members having respective portions forming channels which are sized to be applied laterally over a different one of said offset frame sections, and tongue means on each coupling member which extend between the channel sides of the other coupling member and shaped to fit partially around the frame section which is between the latter channel sides to hold the same in the channel.

6. Coupling means for joining offset frame sections together comprising: a pair of complementary, sheet metal coupling members oriented at right angles to one another, said coupling members each having portions forming respective channels which are sized to be applied laterally over a different one of said offset frame sections, tongue means on each coupling member which extend between the channel sides of the other associated coupling member and shaped to fit partially around the frame section located between the latter channel sides to hold the same in the channel, and tabs extending laterally outwardly from the ends of both channel sides of each coupling member on opposite sides of said tongue means, each tab being opposite a tab on the associated coupling member, and fastening means extending between said tabs for drawing the coupling members together to bring the coupling members tightly around the offset frame sections.

7. In a projection screen assembly including a peripheral frame comprising upper and lower horizontal sections, intermediate vertical sections between said upper and lower horizontal sections, and joints connecting the intermediate vertical sections to the upper and lower horizontal sections, the improvement in said joints between each of the intermediate vertical sections and the horizontal rod sections of the peripheral frame, each of which joints comprises a pair of sheet metal stamping having U-shaped body portions extending at right angles to one another and each having tongues projecting from and generally parallel to the ends of the channels formed by the U-shaped bodies thereof, said tongues associated with each sheet metal stamping having frame section receiving recesses formed in the outer edges thereof which recesses are alined at right angles to the associated channel, the tongues of each sheet metal stamping extending between the sides of the channel formed by the U-shaped body of the other associated sheet metal stamping, the frame sections to be joined being between the U-shaped bodies of the associated stampings and the recessed ends of the tongues of the other sheet metal stamping, each of said latter sheet metal stampings having transverse tabs formed on the ends of the sides of the channel thereof on opposite sides of the associated tongues, and the tabs of the associated sheet metal stampings being juxtaposed, and screw means extending between the tabs for drawing the same together.

8. In a projection screen assembly including a peripheral frame comprising upper and lower horizontal sections, intermediate vertical sections between said upper and lower horizontal sections, removable joints connecting the intermediate vertical sections to the upper and lower horizontal sections, horizontal, leg-supporting sections extending transversely of and below the lower horizontal section of said frame assembly, said intermediate vertical sections extending below said lower horizontal section, and removable joints connecting said leg-supporting sections respectively to the bottom ends of said intermediate sections, the improvement in said joints between each of the intermediate vertical sections and the horizontal section of the peripheral frame and between the intermediate vertical sections and the leg-supporting sections, each of which joints comprises a pair of sheet metal stamping having U-shaped body portions extending at right angles to one another and each having tongues projecting from and generally parallel to the ends of the channels formed by the U-shaped bodies thereof, said tongues associated with each sheet metal stamping having frame section receiving recesses formed in the outer edges thereof which recesses are alined at right angles to the associated channel, the tongues of each sheet metal stamping extending between the sides of the channel formed by the U-shaped body of the other associated sheet metal stamping, the sections to be joined being between the U-shaped bodies of the stampings and the recessed ends of the tongues of the associated sheet metal stamping, each of said latter sheet metal stampings having transverse tabs formed on the ends of the sides of the channel thereof on opposite sides of the associated tongues, the tabs of the associated sheet metal stampings being juxtaposed, means extending between the tabs for drawing the same together, and said leg pieces each comprising a metal stamping in the form of a narrow metal strip bent back and shaped to provide spaces confronting ends with opposed open-ended channels formed therein which receive the associated leg-supporting section, and means extending between said confronting ends below the channels therein for drawing the confronting ends tightly around the leg-supporting section.

9. In a knockdown picture screen assembly including a flexible screen which can be formed into a roll, a knockdown support frame assembly to which the periphery of the screen is removably secured, said support frame assembly being constructed of a number of substantially straight horizontally and vertically oriented peripheral frame members, cross members extending at right angles to said frame members, and respective removable fittings securing each of said cross members to said frame members, the improvement in said last-mentioned fittings each comprising confronting complementary coupling members oriented at right angles to one another and each having a U-shaped portion forming an open-ended channel which receives one of the members to be joined and which extends at right angles to the corresponding channel of the complementary part which receives the other member to be joined, each of said latter confronting coupling members having a pair of tongues which have aligned recesses extending at right angles to the associated channel, said tongues fitting between the channel sides of the other complementary coupling member and fitting over the member in the channel of said other coupling member, and means for drawing said latter coupling members together around the members to be joined.

References Cited in the file of this patent

UNITED STATES PATENTS

| | | |
|---|---|---|
| 732,309 | Marshall | June 30, 1903 |
| 1,020,123 | Brampton et al. | Mar. 12, 1912 |
| 1,199,778 | Getts | Oct. 3, 1916 |
| 2,280,361 | Ackerman | Apr. 21, 1942 |
| 2,357,819 | Greer | Sept. 12, 1944 |
| 2,479,634 | Marques et al. | Aug. 23, 1949 |
| 2,571,382 | Raven | Oct. 16, 1951 |
| 2,658,776 | Wilcox | Nov. 10, 1953 |
| 2,676,044 | Gorman et al. | Apr. 20, 1954 |

FOREIGN PATENTS

| | | |
|---|---|---|
| 633,641 | Germany | Aug. 3, 1936 |